United States Patent [19]
Wier

[11] Patent Number: 5,415,588
[45] Date of Patent: May 16, 1995

[54] WIDE ANGLE UNIVERSAL JOINT

[76] Inventor: Francis L. Wier, 5047 S. Grove St., Englewood, Colo. 80110

[21] Appl. No.: 75,386

[22] Filed: Jun. 14, 1993

[51] Int. Cl.$^6$ .................... F16D 3/16; F16D 3/50
[52] U.S. Cl. .................... 464/114; 403/74; 464/147; 464/905
[58] Field of Search ............ 464/112, 114, 117, 147, 464/905; 403/73, 74, 57

[56] References Cited

U.S. PATENT DOCUMENTS

| | | | |
|---|---|---|---|
| 1,034,569 | 8/1912 | Ranger | 464/905 |
| 1,625,410 | 4/1927 | De Ram | 464/905 |
| 2,033,733 | 3/1936 | Myard | 464/905 |
| 2,263,279 | 11/1941 | Seib | 464/905 |
| 2,666,308 | 1/1954 | Bouchard | 464/17 |
| 3,029,618 | 4/1962 | Bouchard et al. | 464/905 |
| 3,159,013 | 12/1964 | Mazziotti | 464/905 |
| 4,075,871 | 2/1978 | Burke | 464/117 |
| 4,133,189 | 1/1979 | Rineer | 464/121 |

*Primary Examiner*—Daniel P. Stodola
*Assistant Examiner*—Eileen A. Dunn

[57] ABSTRACT

A double cardan wide angle turn close coupled constant velocity universal joint has driving and driven yokes (11 and 12) radially spaced, a pair of X shaped crossheads (19) pivotally mounted to a second pair of opposing yokes (16) closely coupled, driving and driven yokes each overlapping the other in wide angle turns.

2 Claims, 1 Drawing Sheet

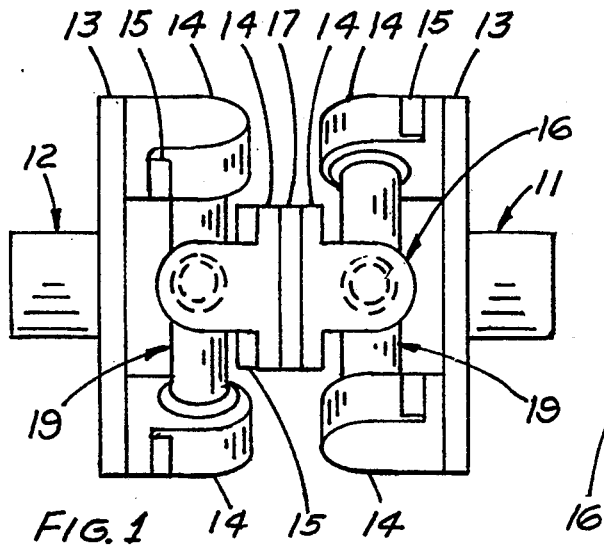
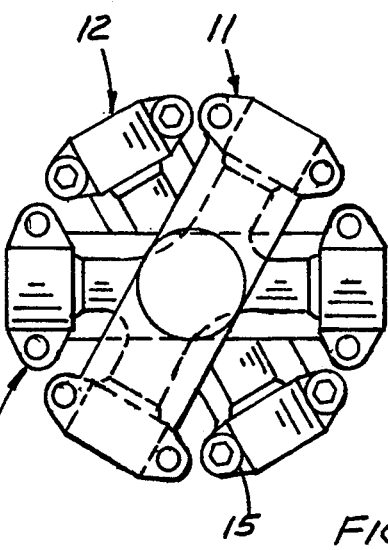
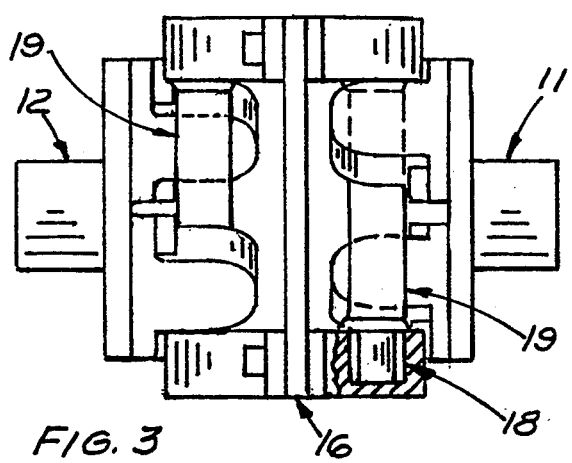
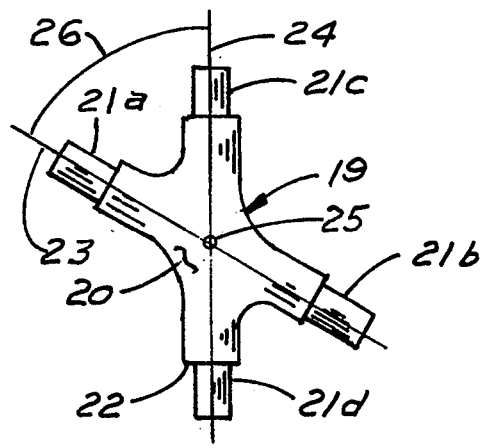
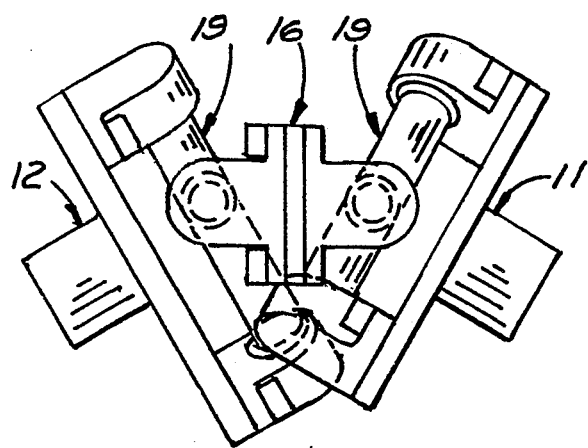

WIDE ANGLE UNIVERSAL JOINT

BACKGROUND OF THE INVENTION

1. Field of the invention

This invention relates to double cardan universal joints, specifically double cardan constant velocity close coupled wide turn angle universal joints.

2. Prior Art

In conventional joints of this type, the total angle of turn is limited relative to the distance between the pivot centers of the yokes and the radial space required for the rotation of the yokes. This is necessary as the driving and driven yokes are normally in alignment and move toward one another during turns and or articulation.

Some attempts have been made to remedy this situation as disclosed in U.S. Pat. Nos. 2,666,308 to Bouchard (1954), and 3,385,081 to Wier (1968). In those joints either the diameter and or length had to be increased thereby limiting the applications.

SUMMARY OF THE INVENTION

The principal object of this invention is to provide a double cardan constant velocity close coupled universal joint which is arranged radially to provide a wide angle of turn between the driving and driven yokes without interference while overlapping and can readily be adapted for use in mechanisms in which the axial and radial space is limited as in steering driving wheels for vehicles.

Another object of this invention is to provide a double cardan constant velocity close coupled universal joint which can be used as a flexible coupling in which the driving and driven yokes can have considerable misalignment and or be at an angle one to the other and wherein the axial and radial space is limited. Another object of this invention is to provide a universal joint that is economical to manufacture.

The foregoing objects are accomplished by providing a joint with X shaped crossheads wherein the trunnions are crossed at approximately 60° to 65° and assembled in pairs to allow the trunnions and equally sized yokes to overlap while turning in less space than required for conventional joints using crossheads with trunnions disposed at right angles.

BRIEF DESCRIPTION OF THE DRAWINGS

FIG. 1 is a plan view of the assembled universal joint with the forked driving and driven yoke shafts aligned.

FIG. 2 is an axial view of the assembled universal joint as it appears from the shaft end of the forked driving yoke.

FIG. 3 is a view of the assembled universal joint as shown in FIG. 1 rotated one quarter turn.

FIG. 4 is an axial view of one of the crossheads in the joint illustrating the angular configuration of the trunnions.

FIG. 5 is a plan view of the assembled universal joint similar to FIG. 1, but disposed in a wide turn with the forked driving and driven yokes overlapping each other.

REFERENCE TO THE NUMERALS IN THE DRAWINGS

| | | | |
|---|---|---|---|
| 11 driving yoke | 16 double yoke | 21a trunnion | 23 axis |
| 12 driven yoke | 17 ctr. flange | 21b trunnion | 24 axis |
| 13 flange | 18 bearing | 21c trunnion | 25 intersection |
| 14 bearing hsg. | 19 crosshead | 21d trunnion | 26 angle |
| 15 bolt | 20 body | 22 shoulder | |

DETAILED DESCRIPTION

Referring to FIG. 1, a forked driving yoke 11, and a forked driven yoke 12, each comprise an integral shaft and flange 13, a pair of bearing housings 14, fixed in place by the use of bolts 15 in a known conventional manner. Preferably, the housings 14 are fitted with sealed needle bearings 18.

A forked double center yoke 16 comprises a flange 17 and two pair of bearing housings 14, preferably fixed in place by the use of bolts 15 in a known conventional manner.

One pair of bearing housings 14 attached to each of the driving and driven flanges 13, are each pivotally fitted to one pair of crosshead trunnions 21a and 21b which are integral with the crossheads 19. The remaining pair of trunnions 21c and 21d are each pivotally fitted to one pair of bearing housings 14 fixed to a flange 17. The crosshead trunnions 21a, 21b, 21c and 21d are provided with shoulders 22 as a sealing surface.

Referring to FIG. 2, the illustration shows the approximate radial displacement of the forked driving and driven yokes 11 and 12 relative to each other and the forked double yoke 16.

Referring to FIG. 3, the details of the illustration are essentially the same as in FIG. 1, but the view shows the assembly rotated on its axis one quarter turn.

Referring to FIG. 4, the illustration shows the approximate configuration of the X shaped crossheads 19 each comprising a body 20, shoulders 22, and trunnions 21a, 21b, 21c, and 21d. The X shape of the crossheads 19, with axes 23 and 24 intersecting at 25 to form angle 26 of approximately 60° to 65°, provides space for the driving and driven yokes 11 and 12 to overlap when assembled in mutually opposed pairs.

Referring to FIG. 5, the illustration shows the forked driving and driven yokes 11 and 12 in a wide turn overlapping each other and the forked double center yoke 16.

As is known, in double cardan universal joints, any variation in the rotational output speed of the first joint is cancelled in the second joint thereby producing an output speed that is essentially constant.

While the invention has been described and illustrated in detail there is no intent to limit the spirit or scope thereof to any precise use or configuration. For example, the universal joint yokes can be of one piece and can have other types of bearing retainers with bolt on flanges or snap ring provisions.

Thus the scope of the invention should be determined by the appended claims and their legal requirements, rather than by the examples given.

I claim:

1. In a universal joint comprising in combination first and second forked yokes operatively connected to a pair of shafts, an intermediate double forked yoke member, two crossheads, each of said crossheads having first and second adjacent pairs of trunnions, each of the first and second adjacent pairs of trunnions having a centerline and the centerlines of the first and second adjacent pairs of trunnions are disposed in a transverse common plane, the first adjacent pair of said trunnions is disposed so that said centerline is disposed at an acute angle with respect to the centerline of said second adjacent pair of trunnions, one of each of the trunnions of said first and second adjacent pairs of said trunnions are journaled and abutted in the first of said forked yokes, the other one of each of the pairs of trunnions of said first and second adjacent pairs of said trunnions are journaled and abutted in the ends of said intermediate double forked yoke member, said crossheads assembled in opposing pairs with said trunnions disposed in opposite quadrants wherein open space is provided for said forked yokes to overlap during a wide turn.

2. The universal joint of claim 1 wherein said first adjacent pair of said trunnions of said crossheads is disposed so that said centerline is disposed at an angle of approximately 50° to 70° with respect to the centerline of said second adjacent pair of trunnions.

* * * * *